(12) United States Patent
Naderi

(10) Patent No.: US 8,812,977 B2
(45) Date of Patent: Aug. 19, 2014

(54) ACCESSING MULTI-PAGE DATA USING A PAGE INDEX IN A SCROLLBAR

(75) Inventor: Nadia Naderi, Tiburon, CA (US)

(73) Assignee: salesforce.com, inc., San Francisco, CA (US)

(*) Notice: Subject to any disclaimer, the term of this patent is extended or adjusted under 35 U.S.C. 154(b) by 128 days.

(21) Appl. No.: 12/901,299

(22) Filed: Oct. 8, 2010

(65) Prior Publication Data

US 2012/0042279 A1    Feb. 16, 2012

Related U.S. Application Data

(60) Provisional application No. 61/373,141, filed on Aug. 12, 2010.

(51) Int. Cl.
G06F 3/048 (2013.01)

(52) U.S. Cl.
USPC .......................................... 715/787

(58) Field of Classification Search
USPC ................................. 715/700, 787
See application file for complete search history.

(56) References Cited

U.S. PATENT DOCUMENTS

| | | | | |
|---|---|---|---|---|
| 5,339,391 A | * | 8/1994 | Wroblewski et al. | 715/854 |
| 5,479,600 A | * | 12/1995 | Wroblewski et al. | 715/835 |
| 5,510,808 A | * | 4/1996 | Cina et al. | 345/684 |
| 5,532,715 A | * | 7/1996 | Bates et al. | 715/273 |
| 5,550,559 A | * | 8/1996 | Isensee et al. | 715/973 |
| 5,577,188 A | | 11/1996 | Zhu | |
| 5,608,872 A | | 3/1997 | Schwartz et al. | |
| 5,634,095 A | * | 5/1997 | Wang et al. | 715/763 |
| 5,649,104 A | | 7/1997 | Carleton et al. | |
| 5,715,450 A | | 2/1998 | Ambrose et al. | |
| 5,761,419 A | | 6/1998 | Schwartz et al. | |
| 5,819,038 A | | 10/1998 | Carleton et al. | |
| 5,821,937 A | | 10/1998 | Tonelli et al. | |
| 5,825,355 A | * | 10/1998 | Palmer et al. | 715/712 |
| 5,831,610 A | | 11/1998 | Tonelli et al. | |
| 5,873,096 A | | 2/1999 | Lim et al. | |
| 5,874,961 A | * | 2/1999 | Bates et al. | 715/786 |
| 5,918,159 A | | 6/1999 | Fomukong et al. | |
| 5,963,953 A | | 10/1999 | Cram et al. | |
| 6,092,083 A | | 7/2000 | Brodersen et al. | |
| 6,169,534 B1 | | 1/2001 | Raffel et al. | |

(Continued)

OTHER PUBLICATIONS

Isensee et al., "Indexed Scroll Bar", Technical Disclosure Bulletin, v. 37, n. 2B, pp. 81-82, Feb. 1994.*

(Continued)

*Primary Examiner* — Stephen Hong
*Assistant Examiner* — Joseph R Burwell
(74) *Attorney, Agent, or Firm* — Ingrassia Fisher & Lorenz, P.C.

(57) ABSTRACT

In one embodiment, a method of accessing multi-page data via a user interface can include: displaying a scrollbar on the user interface, where the scrollbar includes a page index and a scroll indicator; receiving a selection of a page of the data using the page index in the scrollbar on the user interface, where the data is arranged as a plurality of pages; indicating the selected page in the scrollbar with a predetermined indicator, such as a highlight indicator; receiving a selection of a portion of the selected page using the scroll indicator in the scrollbar on the user interface; and displaying the selected portion of the selected page in a main window on the user interface.

22 Claims, 14 Drawing Sheets

(56) References Cited

U.S. PATENT DOCUMENTS

| | | |
|---|---|---|
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,401,094 B1 | 7/2008 | Kesler |
| 7,496,855 B2* | 2/2009 | Guido et al. ............... 715/784 |
| 7,620,655 B2 | 11/2009 | Larsson et al. |
| 7,689,928 B1* | 3/2010 | Gilra ............................ 715/787 |
| 7,698,160 B2 | 4/2010 | Beaven et al. |
| 7,793,230 B2* | 9/2010 | Burns et al. .................. 715/787 |
| 8,082,301 B2 | 12/2011 | Ahlgren et al. |
| 8,095,413 B1 | 1/2012 | Beaven |
| 8,095,594 B2 | 1/2012 | Beaven et al. |
| 8,205,168 B1* | 6/2012 | Van Slembrouck .......... 715/786 |
| 8,275,836 B2 | 9/2012 | Beaven et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0091604 A1* | 4/2005 | Davis ............................ 715/772 |
| 2005/0210403 A1* | 9/2005 | Satanek ......................... 715/786 |
| 2006/0036942 A1* | 2/2006 | Carter ........................... 715/526 |
| 2007/0143705 A1* | 6/2007 | Peters ........................... 715/786 |
| 2007/0294635 A1* | 12/2007 | Craddock et al. ............ 715/784 |
| 2010/0077343 A1* | 3/2010 | Uhl et al. ...................... 715/787 |
| 2010/0298034 A1* | 11/2010 | Shin et al. ..................... 455/566 |
| 2011/0258577 A1* | 10/2011 | Steelberg et al. ............. 715/786 |

OTHER PUBLICATIONS

Cahill et al., "Pager Bar", Technical Disclosure Bulletin, v. 37, n. 1, pp. 483-484, Jan. 1994.*

"System and Method for Scroll Bar Marking and Sectioning", IP.com Prior Art Database, IPCOM000165499D, Dec. 17, 2007.*

Carstens, "Scroll Bar Control with Integrated Methods for Displaying the Position of Slided Objects", IP.com Prior Art Database, IPCOM000189283D, Nov. 23, 2009.*

Byrd, "A scrollbar-based visualization for document navigation", Proceedings of the 4th ACM Conference on Digital Libraries, pp. 122-129, 1999.*

Elmeleegy et al., "Harvesting relational tables from lists on the web", Proceedings of the VLDB Endowment, v. 2, n. 1, pp. 1078-1089, Aug. 2009.*

Kao et al., "Mining web informative structures and contents based on entropy analysis", IEEE Transactions on Knowledge and Data Engineering, v. 16, n. 1, pp. 41-55, Jan. 2004.*

Pirolli et al., "Silk from a Sow's Ear: Extracting Usable Structures from the Web", Proceedings of Conference on Human Factors in Computing Systems (CHI '96), pp. 1-9, Apr. 1996.*

Schuderer, "Talk:Proposal", http://wiki.openoffice.org/wiki/Talk:Proposal_by_Andreas_Schuderer, (2 pages), Jul. 10, 2009.*

* cited by examiner

ACCESSING MULTI-PAGE DATA USING A PAGE INDEX IN A SCROLLBAR

CLAIM OF PRIORITY

This application claims the benefit of U.S. Provisional Patent Application 61/373,141 entitled ACCESSING MULTI-PAGE DATA, filed Aug. 12, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The subject matter described herein relates generally to accessing data, and more particularly to accessing multi-page data in a computing environment.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

To access data spread over multiple web pages or software application views, a user typically is presented with a page index on the current web page or application view. The page index generally includes links to other pages and/or views. Navigating the data may require vertical scrolling to the top or bottom of a view or page using a standard scrollbar and selecting a page from a page index displayed horizontally on the top and/or bottom of the page or view. This design involves excessive vertical and horizontal user hand movement.

BRIEF DESCRIPTION OF THE DRAWINGS

In the following drawings like reference numbers are used to refer to like elements. Although the following figures depict various examples of the invention, the invention is not limited to the examples depicted in the figures.

DETAILED DESCRIPTION

Example General Overview

Systems and methods are provided for navigating multi-page data. These systems and methods are described herein with reference to examples applicable to a multi-tenant database system. These systems and methods are also applicable to many other computing environments, including an MS Windows operating system environment, any web-browsing environment, an Apple OS operating environment, a cellular phone environment, etc.

As used herein, an example multi-tenant database system includes those systems in which various elements of hardware and software of the database system may be shared by one or more customers. For example, a given application server may simultaneously process requests for a great number of customers, and a given database table may store rows for a potentially much greater number of customers.

Example System Overview

As noted above, the example multi-tenant database system as described herein represents only one possible example system where particular embodiments may be utilized. One or more embodiments are applicable to a wide variety of other systems and/or arrangements.

Figure 1:
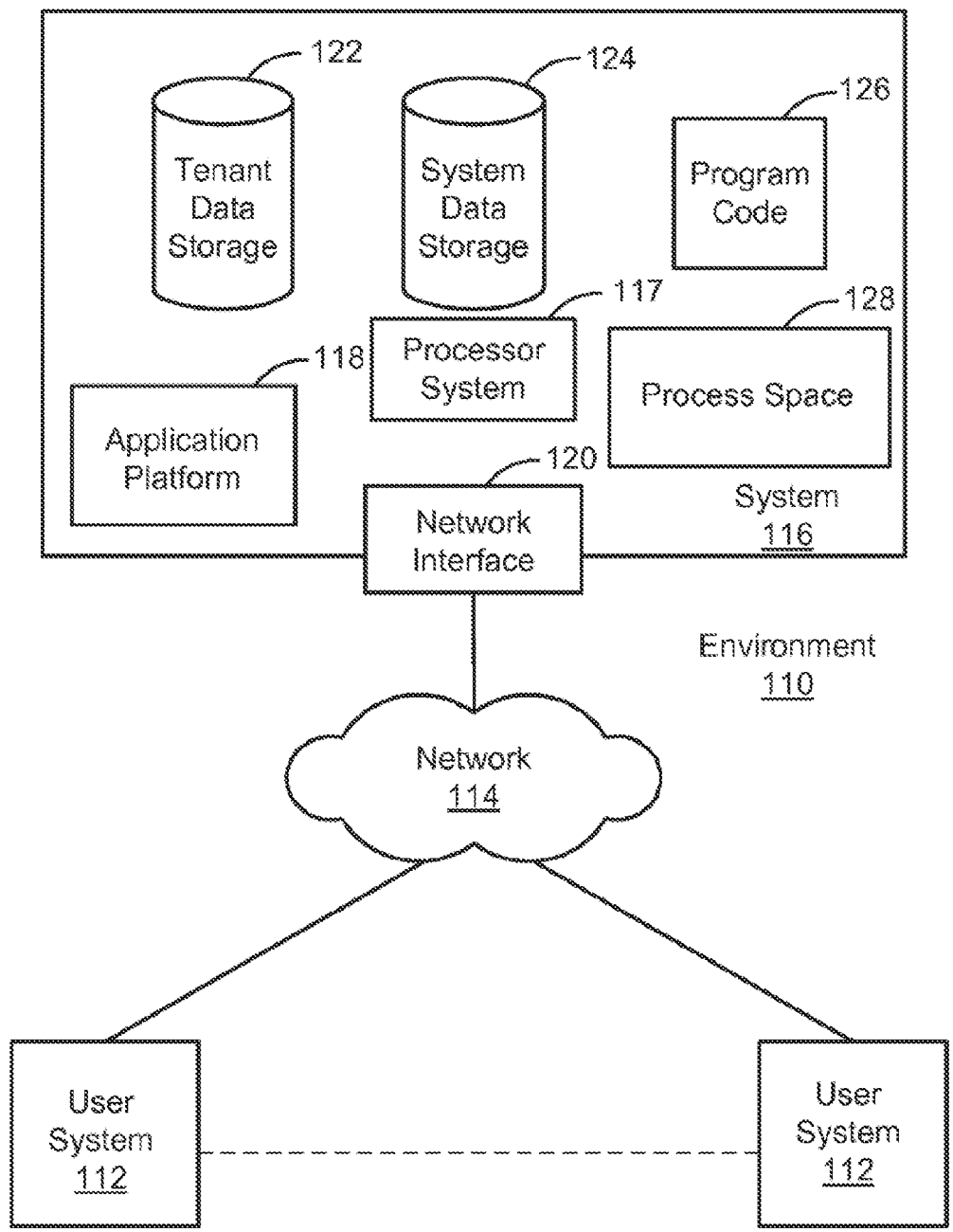
FIG. 1 illustrates a block diagram of an example environment wherein an on-demand database service might be used.

FIG. 1 illustrates a block diagram of an environment 110 wherein an on-demand database service might be used. Environment 110 may include user systems 112, network 114, system 116, processor system 117, application platform 118, network interface 120, tenant data storage 122, system data storage 124, program code 126, and process space 128. In other embodiments, environment 110 may not have all of the components listed and/or may have other elements instead of, or in addition to, those listed above.

Environment 110 is an environment in which an on-demand database service exists. User system 112 may be any machine or system that is used by a user to access a database user system. For example, any of user systems 112 can be a handheld computing device, a mobile phone, a laptop computer, a work station, and/or a network of computing devices. As illustrated in FIG. 1 (and in more detail in FIG. 2) user systems 112 might interact via a network 114 with an on-demand database service, which is system 116.

An on-demand database service, such as system 116, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 116" and "system 116" will be used interchangeably herein. A database image may include one or more database objects. A relational database management system (RDMS) or the equivalent may execute storage and retrieval of information against the database object(s). Application platform 118 may be a framework that allows the applications of system 116 to run, such as the hardware and/or software, e.g., the operating system. In an embodiment, on-demand database service 116 may include an application platform 118 that enables creation, managing and executing one or more applications developed by the provider of the on-demand database service, users accessing the on-demand database service via user systems 112, or third party application developers accessing the on-demand database service via user systems 112.

The users of user systems 112 may differ in their respective capacities, and the capacity of a particular user system 112 might be entirely determined by permissions (permission levels) for the current user. For example, where a salesperson is using a particular user system 112 to interact with system 116, that user system has the capacities allotted to that salesperson. However, while an administrator is using that user system to interact with system 116, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 114 is any network or combination of networks of devices that communicate with one another. For example, network 114 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 112 might communicate with system 116 using TCP/IP and, at a higher network level, use other common Internet protocols to communicate, such as HTTP, FTP, AFS, WAP, etc. In an example where HTTP is used, user system 112 might include an HTTP client commonly referred to as a "browser" for sending and receiving HTTP messages to and from an HTTP server at system 116. Such an HTTP server might be implemented as the sole network interface between system 116 and network 114, but other techniques might be used as well or instead. In some implementations, the interface between system 116 and network 114 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 116, shown in FIG. 1, implements a web-based customer relationship management (CRM) system. For example, in one embodiment, system 116 includes application servers configured to implement and execute CRM software applications as well as provide related data, code, forms, webpages and other information to and from user systems 112 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 116 implements applications other than, or in addition to, a CRM application. For example, system 16 may provide tenant access to multiple hosted (standard and custom) applications, including a CRM application. User (or third party developer) applications, which may or may not include CRM, may be supported by the application platform 118, which manages creation, storage of the applications into one or more database objects and executing of the applications in a virtual machine in the process space of the system 116.

One arrangement for elements of system 116 is shown in FIG. 1, including a network interface 120, application platform 118, tenant data storage 122 for tenant data 123, system data storage 124 for system data 125 accessible to system 116 and possibly multiple tenants, program code 126 for implementing various functions of system 116, and a process space 128 for executing MTS system processes and tenant-specific processes, such as running applications as part of an application hosting service. Additional processes that may execute on system 116 include database indexing processes.

Several elements in the system shown in FIG. 1 include conventional, well-known elements that are explained only briefly here. For example, each user system 112 could include a desktop personal computer, workstation, laptop, PDA, cell phone, or any wireless access protocol (WAP) enabled device or any other computing device capable of interfacing directly or indirectly to the Internet or other network connection. User system 112 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 112 to access, process and view information, pages and applications available to it from system 116 over network 114. Each user system 112 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 116 or other systems or servers. For example, the user interface device can be used to access data and applications hosted by system 116, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 112 and all of its components are operator configurable using applications, such as a browser, including computer code run using a central processing unit such as an Intel Pentium® processor or the like. Similarly, system 116 (and additional instances of an MTS, where more than one is present) and all of their components might be operator configurable using application(s) including computer code to run using a central processing unit such as processor system 117, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 116 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 116 is configured to provide webpages, forms, applications, data and media content to user (client) systems 112 to support the access by user systems 112 as tenants of system 116. As such, system 116 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
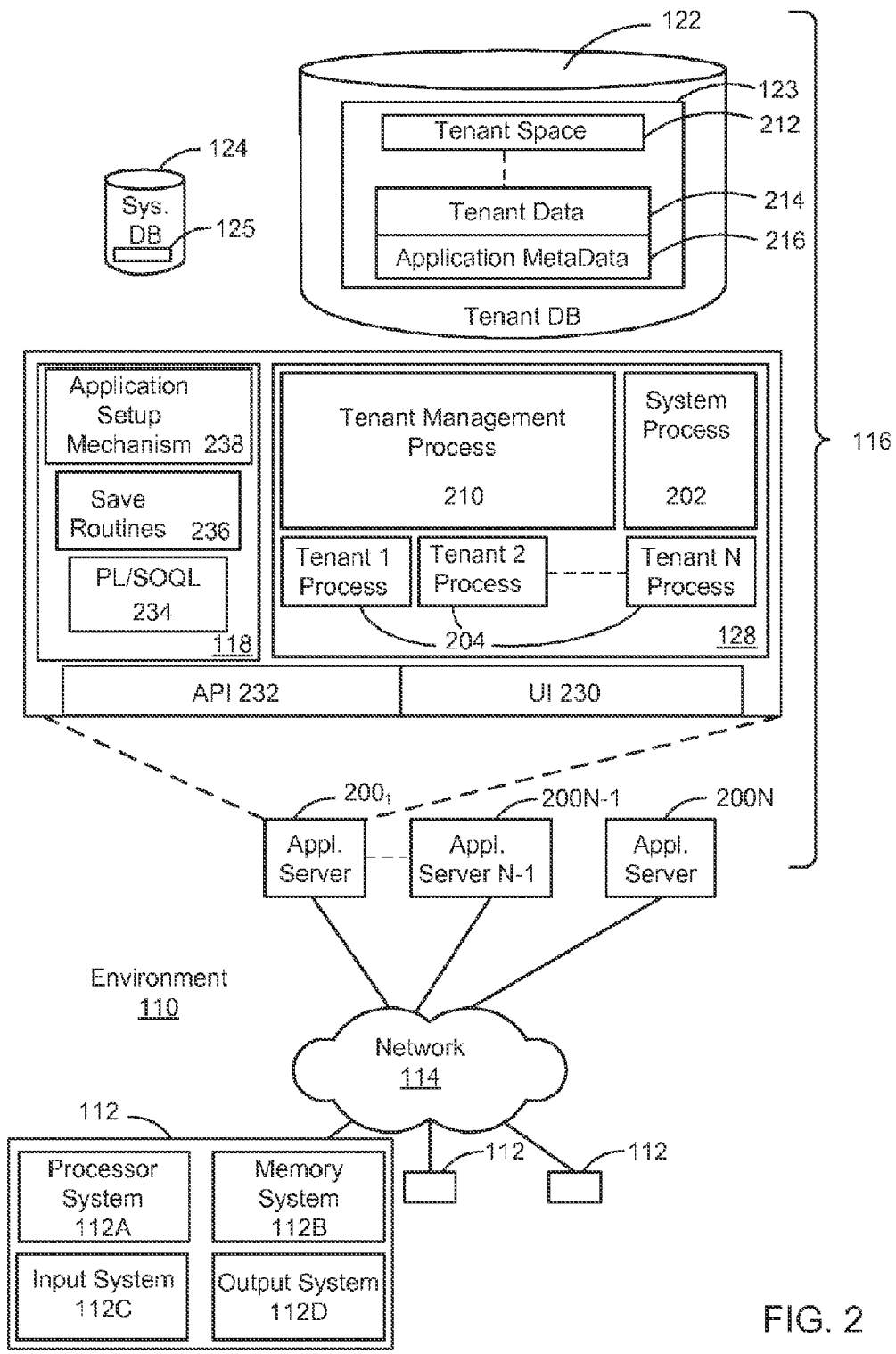
FIG. 2 illustrates a block diagram of example elements of FIG. 1 and various possible interconnections between these elements.

FIG. 2 also illustrates environment 110. However, in FIG. 2 elements of system 116 and various interconnections in an embodiment are further illustrated. FIG. 2 shows that user system 112 may include processor system 112A, memory system 112B, input system 112C, and output system 112D. FIG. 2 shows network 114 and system 116. FIG. 2 also shows that system 116 may include tenant data storage 122, tenant data 123, system data storage 124, system data 125, User Interface (UI) 230, Application Program Interface (API) 232, PL/SOQL 234, save routines 236, application setup mechanism 238, applications servers $200_1$-$200_N$, system process space 202, tenant process spaces 204, tenant management process space 210, tenant storage area 212, user storage 214, and application metadata 216. In other embodiments, environment 110 may not have the same elements as those listed above and/or may have other elements instead of, or in addition to, those listed above.

User system 112, network 114, system 116, tenant data storage 122, and system data storage 124 were discussed above in FIG. 1. Regarding user system 112, processor system 112A may be any combination of one or more processors. Memory system 112B may be any combination of one or more memory devices, short term, and/or long term memory. Input system 112C may be any combination of input devices, such as one or more keyboards, mice, trackballs, scanners, cameras, and/or interfaces to networks. Output system 112D may be any combination of output devices, such as one or more monitors, printers, and/or interfaces to networks. As shown by FIG. 2, system 116 may include a network interface 120 (of FIG. 1) implemented as a set of HTTP application servers 200, an application platform 118, tenant data storage 122, and system data storage 124. Also shown is system process space 202, including individual tenant process spaces 204 and a tenant management process space 210. Each application server 200 may be configured to tenant data storage 122 and the tenant data 123 therein, and system data storage 124 and the system data 125 therein to serve requests of user systems 112. The tenant data 123 might be divided into individual tenant storage areas 212, which can be either a physical arrangement and/or a logical arrangement of data. Within each tenant storage area 212, user storage 214 and application metadata 216 might be similarly allocated for each user. For example, a copy of a user's most recently used (MRU) items might be stored to user storage 214. Similarly, a copy of MRU items for an entire organization that is a tenant might be stored to tenant storage area 212. A UI 230 provides a user interface and an API 232 provides an application programmer interface to system 116 resident processes to users and/or developers at user systems 112. The tenant data and the system data may be stored in various databases, such as one or more Oracle™ databases.

Application platform 118 includes an application setup mechanism 238 that supports application developers' creation and management of applications, which may be saved as metadata into tenant data storage 122 by save routines 236 for execution by subscribers as one or more tenant process spaces 204 managed by tenant management process 210 for example. Invocations to such applications may be coded using PL/SOQL 234 that provides a programming language style interface extension to API 232. Invocations to applications may be detected by one or more system processes, which manages retrieving application metadata 216 for the subscriber making the invocation and executing the metadata as an application in a virtual machine.

Each application server 200 may be communicably coupled to database systems, e.g., having access to system data 125 and tenant data 123, via a different network connection. For example, one application server 200₁ might be coupled via the network 114 (e.g., the Internet), another application server 200_{N-1} might be coupled via a direct network link, and another application server 200_N might be coupled by yet a different network connection. Transfer Control Protocol and Internet Protocol (TCP/IP) are typical protocols for communicating between application servers 200 and the database system. However, it will be apparent to one skilled in the art that other transport protocols may be used to optimize the system depending on the network interconnect used.

In certain embodiments, each application server 200 is configured to handle requests for any user associated with any organization that is a tenant. Because it is desirable to be able to add and remove application servers from the server pool at any time for any reason, there is preferably no server affinity for a user and/or organization to a specific application server 200. In one embodiment, therefore, an interface system implementing a load balancing function (e.g., an F5 Big-IP load balancer) is communicably coupled between the application servers 200 and the user systems 112 to distribute requests to the application servers 200. In one embodiment, the load balancer uses a least connections algorithm to route user requests to the application servers 200. Other examples of load balancing algorithms, such as round robin and observed response time, also can be used. For example, in certain embodiments, three consecutive requests from the same user could hit three different application servers 200, and three requests from different users could hit the same application server 200. In this manner, system 116 is multi-tenant, wherein system 116 handles storage of, and access to, different objects, data and applications across disparate users and organizations.

As an example of storage, one tenant might be a company that employs a sales force where each salesperson uses system 116 to manage their sales process. Thus, a user might maintain contact data, leads data, customer follow-up data, performance data, goals and progress data, etc., all applicable to that user's personal sales process (e.g., in tenant data storage 122). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 116 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 116 might also maintain system level data usable by multiple tenants or other data. Such system level data might include industry reports, news, postings, and the like that are sharable among tenants.

In certain embodiments, user systems 112 (which may be client systems) communicate with application servers 200 to request and update system-level and tenant-level data from system 116 that may require sending one or more queries to tenant data storage 122 and/or system data storage 124. System 116 (e.g., an application server 200 in system 116) automatically generates one or more SQL statements (e.g., one or more SQL queries) that are designed to access the desired information. System data storage 124 may generate query plans to access the requested data from the database.

Accessing Multi-Page Data

In order to navigate and view large amounts of information, web pages and software applications often have information organized in the form of multi-page data (e.g., data spread over multiple pages or views within a web browser or other software application). A common technique for navigating the multi-page data is to use "pagination," whereby a page or view (collectively referred to herein as a "page") is selected and accessed using a page index (usually shown at the top or bottom of the page). The page index lists all or some of the available pages of the data (e.g., from an alphanumeric ordering of the pages). Also, a scrollbar (e.g., a vertical scroll bar displayed at the right side of the page) is often available for a user to scroll to the top or bottom of a selected page of data. However, this approach involves both substantial vertical and substantial horizontal hand movement in order to navigate the multiple pages of data. As a result, this approach has ergonomic drawbacks, as well as productivity drawbacks. For example, a user may become distracted when trying to access a particular page of data. In addition, page selections can be time consuming as pages are accessed and loaded (e.g., from a server or a local drive) one by one.

Figure 3:
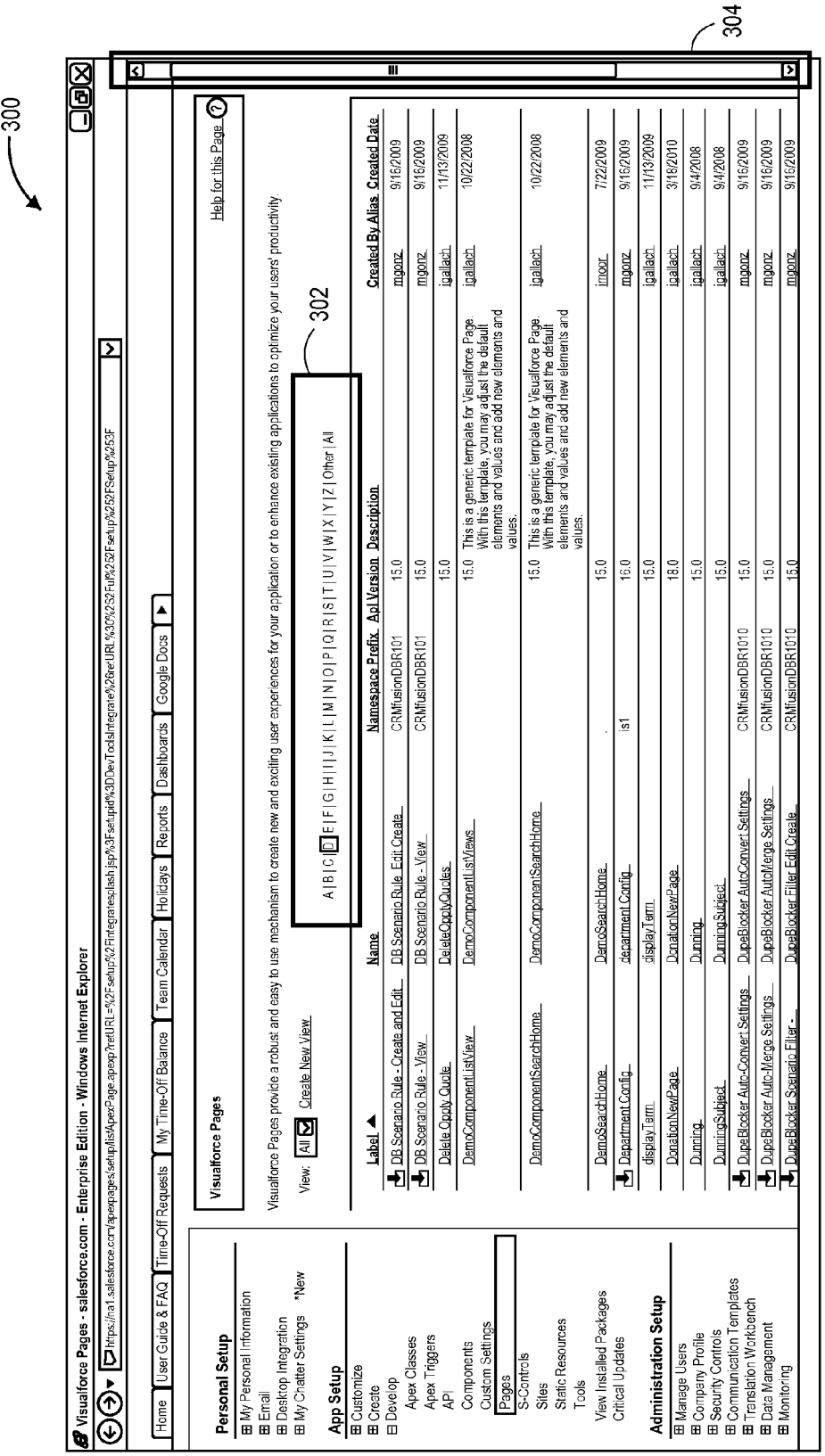
FIG. 3 is a screenshot of an example multi-page data navigation approach, according to one embodiment.

FIG. 3 shows an example of a conventional multi-page data navigation approach. To view data, a user scrolls up and down to view the content of a page using standard vertical scrollbar 304. In addition, the user navigates from page to page by clicking on a particular page (e.g., page "D") along horizontal page index 302. Thus, in order to select and display desired information, a user typically has to navigate to and make selections from different locations on web page/browser 300. As a result, the user navigates the multi-page data by using different areas on the screen with different orientations (e.g., some vertical and some horizontal). To illustrate, consider in FIG. 3 that to navigate from the current selected page (e.g., page "D") to the next page (e.g., page "E"), the user must move the mouse up to the top of the page using standard vertical scrollbar 304 just to view horizontal page index 302. The user then selects Page "E" from horizontal page index 302.

A more seamless look and feel can be provided in a user friendly and enhanced design that combines both multi-level pagination and scrolling in a single scrollbar. This approach minimizes hand movement, improves ergonomics, and enables the user to potentially navigate pages for display much faster than conventional approaches. For example, repetitive vertical (e.g., up/down) type movements can be substantially reduced because navigation of large amounts of data (e.g., multi-page data) may be accessed by using a combination page index and a scroll indicator, according to one embodiment. As another example, repetitive left/right and top/side movements can also be reduced relative to conventional approaches because the page index and scroll indicator may be located in relatively close proximity to form a "Scrollodex," according to one embodiment. For example, a same region on the user display can contain both the page index and scroll indicator. Accordingly, the potential viewing area or real estate on a display screen for the user to display such pages of data is enhanced with the one or more approaches described herein. In addition, the implementations discussed herein are applicable to any type of data organized in the form of pages or other portions suitable for navigation and viewing by a user.

In one implementation, techniques and mechanisms for accessing multi-page data via a user interface includes displaying a scrollbar on the user interface, where the scrollbar includes page index and scroll indicator controls. These techniques and mechanisms can also include techniques and mechanisms for receiving page selection input at the page index in the scrollbar. The techniques and mechanisms can also highlight a selected page in the scrollbar's page index using a highlight indicator. The techniques and mechanisms can also include receive input from a user to select a portion of a page using the scroll indicator in the scrollbar on the user interface, and displaying the selected portion of the page in a main window on the user interface.

Note that implementations described herein are generally described in the context of a vertical scrollbar, however, in other implementations the scrollbar, scroll indicator, and page index may be oriented in a different direction (e.g. horizontally, diagonally, in reverse, or some other way).

Figure 4:
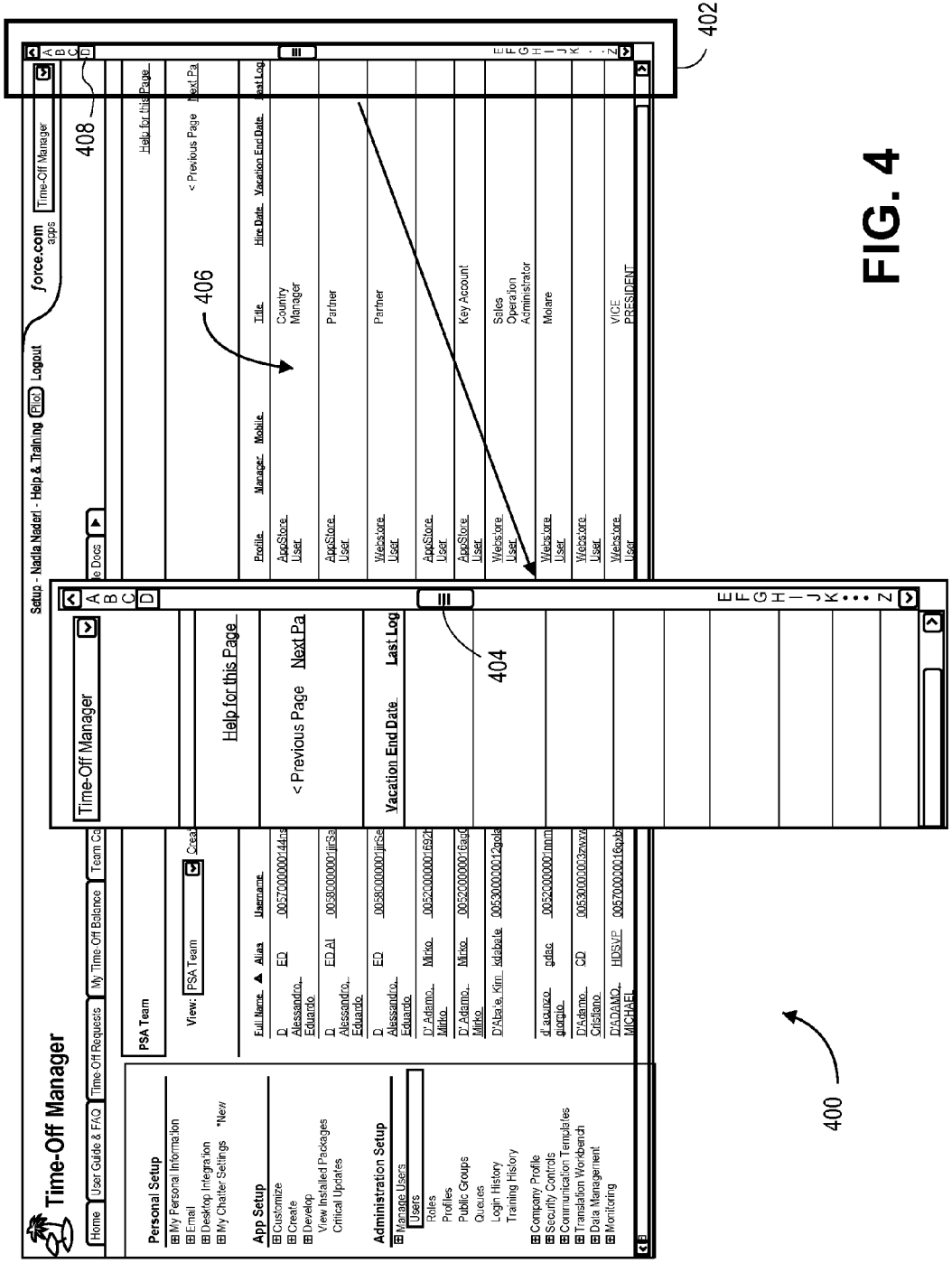
FIG. 4 is a screenshot of an example scrollbar with a page index for multi-page data navigation, according to one embodiment.

FIG. 4 illustrates an example screenshot 400 of a scrollbar with a page index for multi-page data navigation, according to one embodiment. In this example, scrollbar 402 includes both a page index (e.g., A, B, C, D, . . . Z) and a scroll indicator 404 (e.g., a movable sliding bar or some other user interface control). The page index is, in one embodiment, a listing of pages accessible to the user. The page index may list every page accessible to the user or it may list a subset of those pages. The listing can be alphanumerical or in some other format. The The page index may be listed in a sorted order or listed based on some other criteria (e.g., page rank, most recently accessed page, bookmarked pages, etc.). In particular embodiments, a user can customize these and other features of the page index.

Returning to FIG. 4, as illustrated, a user moves scroll indicator 404 from the top of scroll bar 402 to a place in the middle of the scroll bar. In the process of doing so, scroll bar 402 scrolls through various pages of page index 408 until the user reaches a page (e.g., page D), displayed in main window 406. In one embodiment, the corresponding page, in this case "D", in page index 408 may also be highlighted in scrollbar 402.

In one implementation, a user may provide an initial input (e.g., a right-click on the scroll bar) to activate and, hence, display page index 408. In this way, the user can use the same scroll bar to scroll through both the page index and the selected page itself. For example, assume a user wishes to scroll through a set of multi-page data. The user right-clicks on scroll bar 402 (or provides some other user input) to activate the page index. The user scrolls through various pages by moving the scroll indicator 404 down until the user reaches a desired page. In one implementation, the user then turns off the page index through a second input (e.g., via a second right mouse click). The user can then use the scroll bar 402 to navigate and view the page itself.

In other embodiments, other techniques and mechanisms, such as time delays, keyboard commands, and other user input, may also be used to activate and access the page index 408. In one implementation, the page index and scroll indicator 404 are persistently active. In this and other implementations, the ability to turn the page index on or off may be user configurable.

Various aspects of scrollbar 402, which contains scroll indicator 404 and page index 408, in some implementations, can be configured by a user. For example, when active, the first and last page may be shown on scrollbar 402, as well as the current page. In addition, a predetermined number of additional pages before and after the current page may also be displayed on scrollbar 402. In the particular example shown in FIG. 4, pages E through K are shown in the page index. The " . . . " indicates that other pages exist between page index K and the last page index Z. The number of page s shown before and after the current page in the page index is just one of many options that may be configurable by a user in order to customize scrollbar 402. Various example user configurations are further discussed with reference to FIG. 10.

In one embodiment, multi-page data can be viewed in a contiguous format, rather than strictly viewing only one page at a time. For example, a user may use the scroll indicator to navigate to a selected page. As the user scrolls to the end of a previous page (e.g., page i−1) and to the beginning of a current page (e.g., page i), the current page is automatically retrieved and appended to the bottom of the previous page. Thus, portions of two pages may be viewed together in main window 406 by appropriate use of sliding bar 402 and scroll indicator 404. In one implementation, a user may configure sliding bar 404 to navigate either by accessing strictly one page at a time or by crossing over to a next page.

In one embodiment, pages may also be cached and loaded based on the current page index. For example, assume a user has navigated to page i. In one example, surrounding pages i−1 and i+1 may also be accessed and cached on the user's system in order to allow for fast display of the next and/or previous page(s). Accordingly, if a user scrolls up to the previous page, the previous page is cached and quickly loaded into the viewer. Such caching also allows for viewing of pages in contiguous form, as described above. Other forms of caching for faster navigation through a subset of pages can also be accommodated in particular embodiments. For example, pages i−2 and i+2 may also be cached, bookmarked pages may be cached for faster load times, and other page caching variations may be used to speed up page access. In one embodiment, what pages are cached is user configurable, as discussed in herein.

Figure 5:
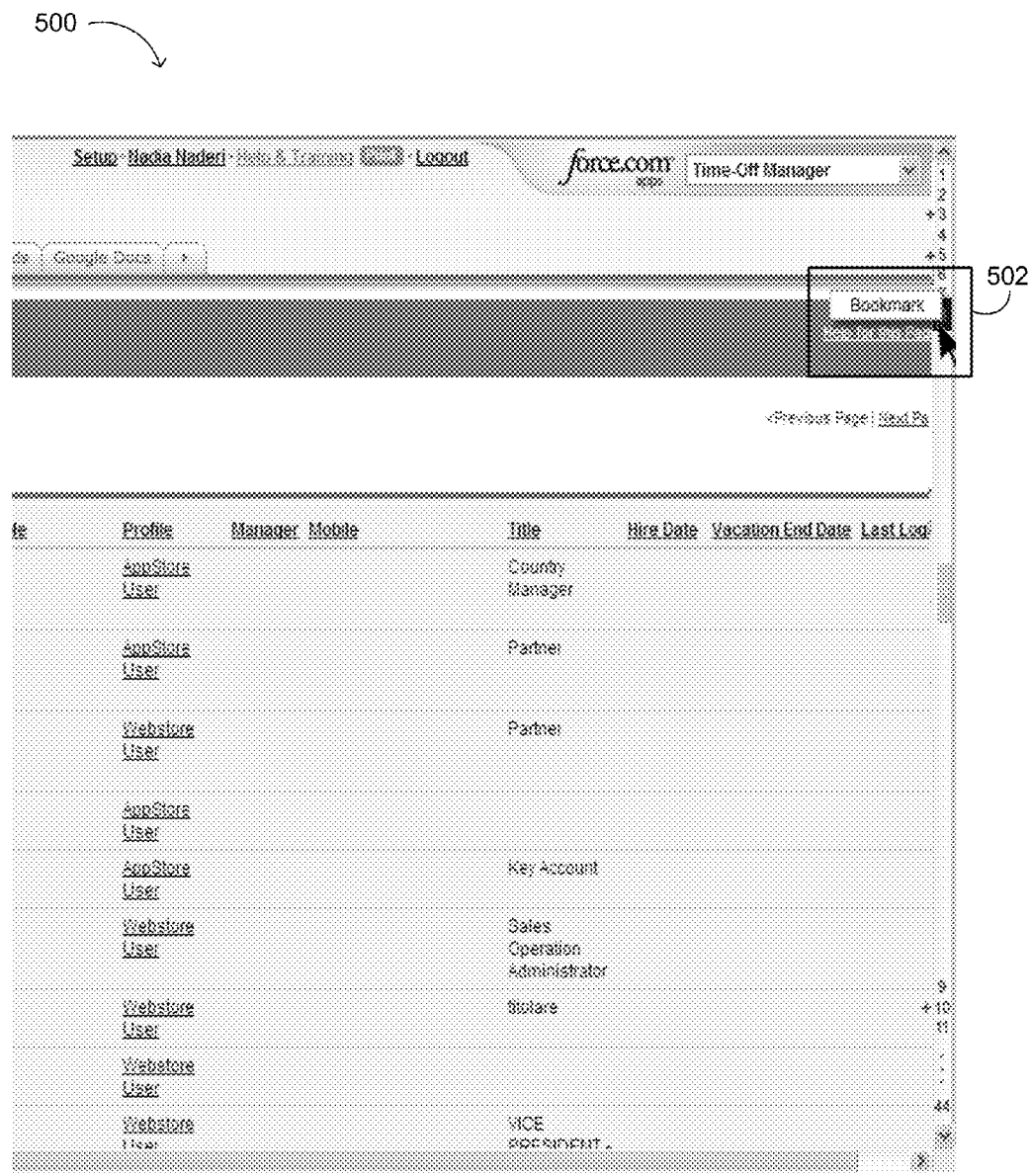
FIG. 5 is a screenshot of an example illustrating a bookmark in a scrollbar with a page index, according to one embodiment.

Referring now to FIG. 5, shown is an example screenshot 500 of a bookmarked page in a scrollbar with a page index. In one embodiment, a mouse trigger (e.g., by clicking a right mouse button, double-clicking, mouse-over, etc.) or other suitable selection mechanism on the page index gives the user the option to 'Bookmark' 502 a page. By selecting the mouse trigger or other selection mechanism, the user bookmarks the page 502. Such bookmarks can be cached while the user is accessing multi-page data. Alternatively, the bookmark may be stored in a data file associated with the user (e.g., in user system 112 and/or system 116). According to one embodiment, a user profile associated with a user maintains a list of bookmarked pages. In one embodiment, the bookmarked pages are pre-loaded when multi-page data is accessed. Accordingly, the user can selectively move from one bookmarked page to another.

Further, a mouse action on a bookmarked page can allow the user to undo the bookmark. For example, the mouse trigger (e.g., right click, double-click, mouse-over, etc.) or other suitable selection mechanism on a bookmarked page index may provide the option to remove the bookmark.

Accordingly, the user may selectively remove the bookmark from the page index. These and other bookmark options may also be user configurable.

In one embodiment, a removed bookmark may undo any user configured actions for treatment of a particular bookmarked page. In this or other embodiments, user configurations for any remaining bookmarked pages are unaffected by the removal of a bookmarked page.

Figure 6:
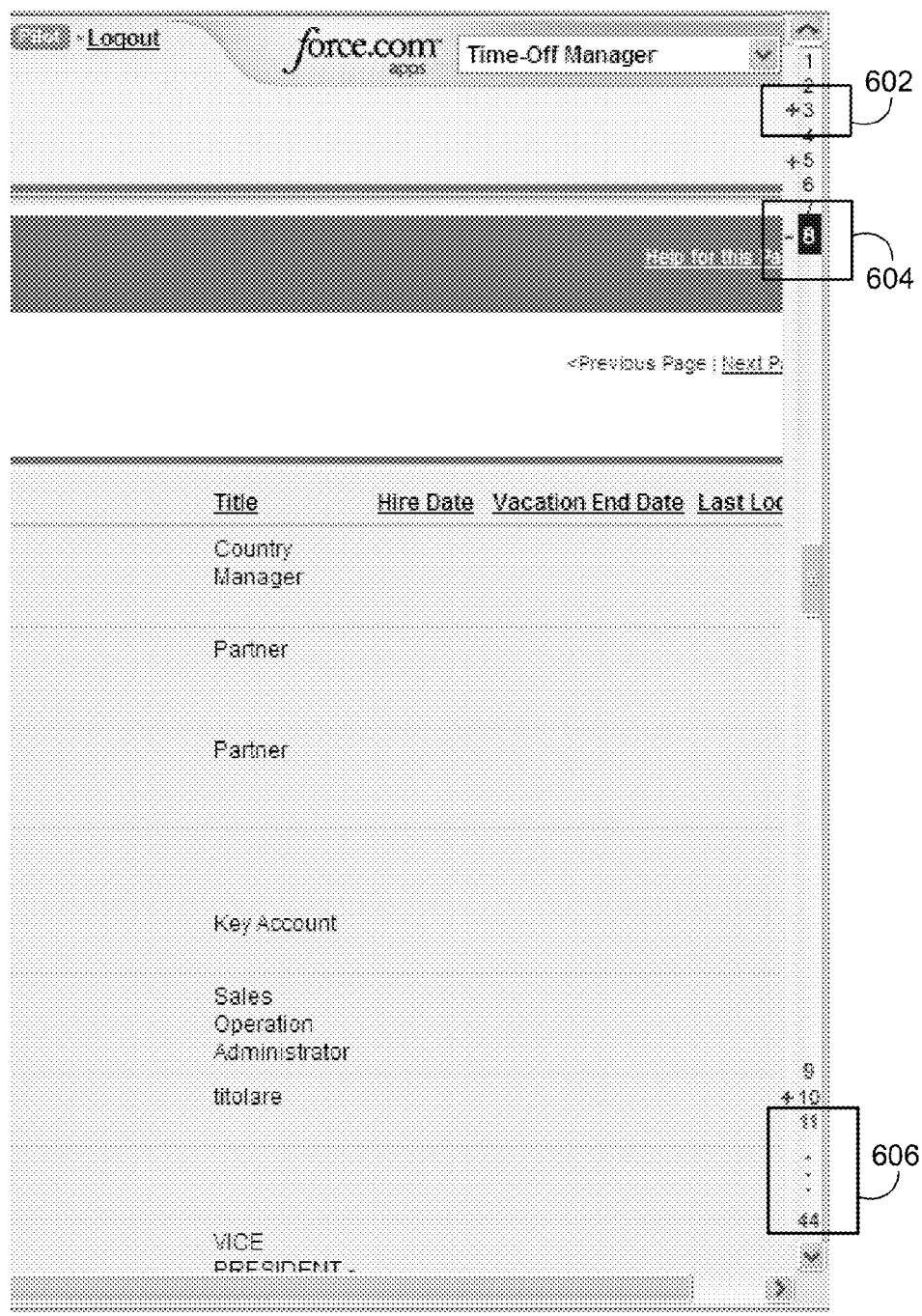
FIG. 6 is a screenshot showing an example bookmarked page with selected page indicators in a scrollbar having a page index, according to one embodiment.

Referring now to FIG. 6, it shows an example screenshot 600 of bookmarked pages and selected page indicators in an enhanced scrollbar, according to one embodiment. As illustrated, when a page is bookmarked, a predetermined bookmark indicator may be shown next to the bookmarked page. For example, assume page 3 602 is bookmarked. In this example, a bookmark indicator (e.g., a "+" sign) preceding the "3" on the scrollbar indicates that page 3 has been bookmarked in the page index. Bookmark indicator 602 may be a character, a highlight color, a picture or graphic, or any other indicator suitable to bring attention to a bookmarked page. In one embodiment, the bookmark indicator is user configurable. In this and other embodiments, a bookmark indicator may be personalized to the user.

Returning to FIG. 6, when a user clicks on, or otherwise selects, a page in the page index, the selected page is opened for display in the main window. As discussed above, the selected page may be highlighted and displayed in an appropriate location in the page index. For example, since page 8 is the current page, the scrollbar shows page 8 (608) highlighted in the page index. Additionally, if the selected page is bookmarked, in one embodiment, the scrollbar may include a further visual cue to the user to indicate that the page is both the current page and a bookmarked page. For example, in addition to highlighting page 8, the scrollbar shows the "+" indicator changed to a "−" indicator when bookmarked page 8 is selected by the user. In this way, a user is provided with additional information about the current page. In one implementation, these indicators may be standard user interface controls for expanding or collapsing a window or view. In this and other embodiments, the indicators are user configurable. For example, the user may select which alphanumerical character, symbol, color, or other visual cue indicates a bookmarked page.

As discussed above, any alphanumeric or other suitable indicators can be used to identify different pages of data in the page index. For example, capital letters (e.g., A, B, C, etc.), lowercase letters (e.g., a, b, c, etc.), numbers (e.g., 1, 2, 3, etc.), or any other suitable symbols or characters can be utilized to identify different pages. Further, initial (e.g., page 1) and final (e.g., page 44) number of records in the page can also be indicated as shown, with vertical dots (see, e.g., 606) providing a visual cue that more data exists in between. These and various other options related to the display of the page index are user configurable.

Figure 7:
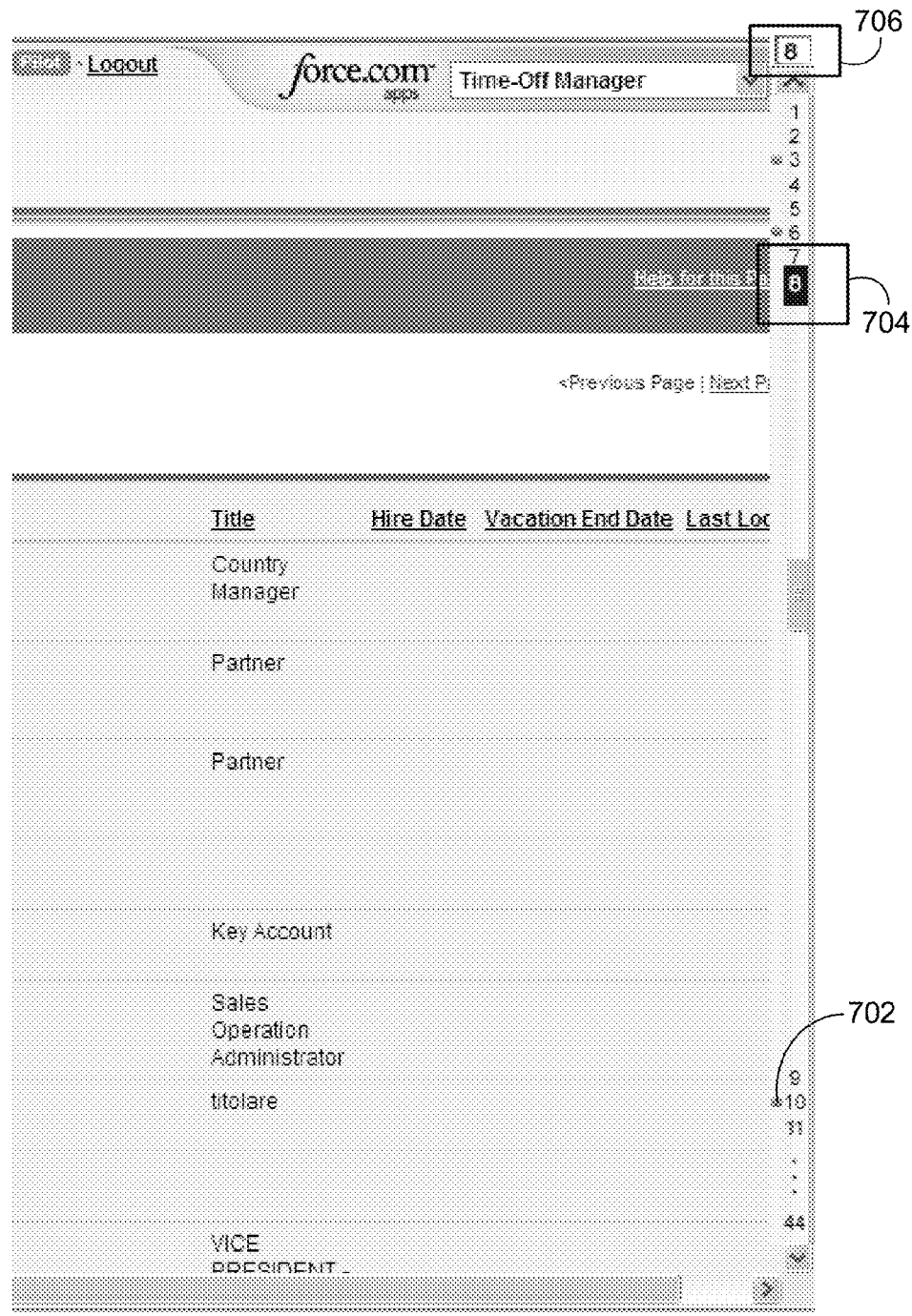
FIG. 7 is a screenshot showing an example bookmarked page and selected page indicators in a scrollbar with a page index and a page select edit box, according to one embodiment.

Referring now to FIG. 7, it shows an example screenshot 700 of a bookmarked page and page indicators associated with a scrollbar with a page index, according to one embodiment. In addition, screenshot 700 illustrates an example page select edit box 706, according to one embodiment. In this illustration, a large dot 702 is used to indicate a bookmarked page. In addition, in one embodiment, the current page is shown in multiple ways. For instance, the current page is highlighted in black 704 and displayed in page select edit box 706.

Page select edit box 706, in one implementation, allows the user to selectively enter (e.g., by typing, dragging and dropping, etc.) a new page number. By doing so, the user can selectively change the current page. This may be particularly suitable if the number of pages indexed is relatively large. In addition, according to one embodiment, if a user inputs a page number that does not correspond to any page in the page index (e.g., the user types in "46" when the last page is 44), then a page closest to the input number may be displayed as the current page. Along with that, page select edit box 706 may be updated to reflect the current page (e.g., the closest page to the previously input number). In this and other embodiments, if an incorrect page number is input, the current page may remain the same, a default page may be displayed, or an error message may be displayed. In one embodiment, a user can configure the default action when an incorrect page number is input.

Figure 8:
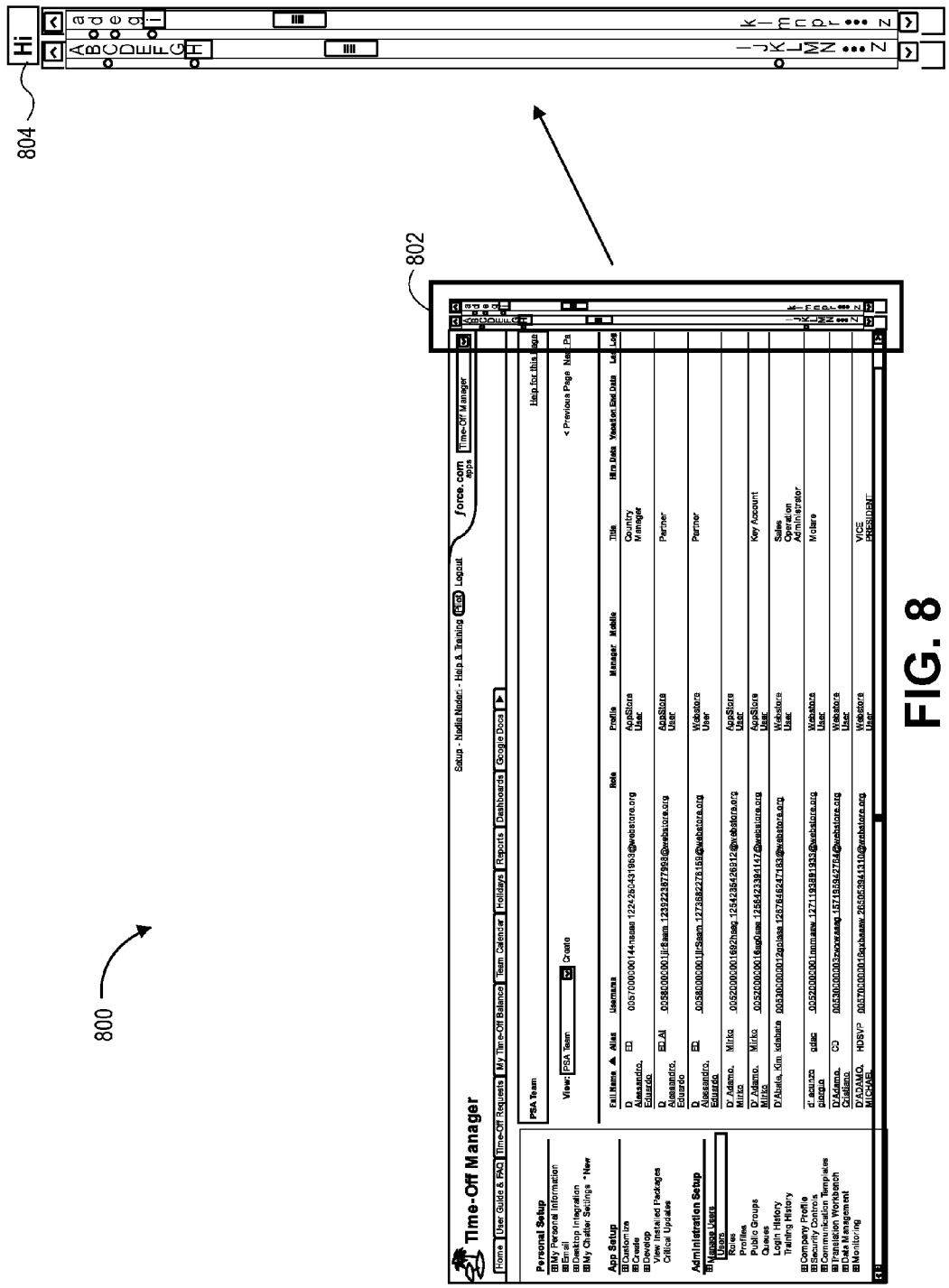
FIG. 8 is a screenshot showing an example of multiple scrollbars for navigating multi-page data, according to one embodiment.

FIG. 8 shows an example screenshot 800 of multiple scrollbars 802 for navigating multi-page data, according to one embodiment. As illustrated, two or more scrollbars may be used. This multiple scrollbar feature may be particularly useful for navigation of large amounts of data. Further, different scrollbars can be defined to navigate different sets or groupings of data. They may even navigate the data in different ways. For example, in one embodiment, a first scrollbar may used to scroll through chapters of data and the second scrollbar may be used to scroll through individual pages of a chapter. Alternatively, the first scrollbar may be used to navigate through a page index and the second scrollbar allows the user to navigate through an individual page. As yet another example, a first scrollbar may represent the first letter of the last name of people in a directory, the second scrollbar the second letter of people in a directory, a third scrollbar the first letter of the first name of people in the directory, etc. As another example, a first scrollbar can be used to navigate one data set, while a second scrollbar can be used to navigate another data set, where the two sets of data are not necessarily related. As a further example, a first scrollbar can be used to navigate pages of data for a first user, while a second scrollbar can be used to navigate pages of the data for a second user. This last example may be suitable for teams having multiple users working on a same set of data. In addition, a "tool-tip" or pop-up text box can appear, e.g., via a mouse-over, to show designated purposes for each scrollbar. For example, "Chapter" can be shown in such a pop-up for a mouse over of a first scrollbar, while "Page" can be shown in such a pop-up for a mouse over of a second scrollbar. Alternatively, fixed title indicators can be used instead of pop-ups activated by mouse-over action.

Further, a user may define a maximum number of pages for each scrollbar, and if the data is organized such that the actual number of pages indexed exceed this maximum number, then another scrollbar may be added, either dynamically at runtime or when the system loads, to accommodate the additional pages indexed. In addition, a width of each scrollbar can be designated by a user via user configurations, or the width can be automatically changed to conform to the particular page index designators (e.g., a wider width can be used when Roman numerals are chosen, as opposed to lower case letters, for page index indicators).

Particular embodiments may also automatically organize a number of pages in a data set such that a full-page fits the main window in full. For this situation, multiple scrollbars can be created to accommodate a larger number of pages. Any number of scrollbars, as well as any suitable data organizations, can be accommodated in particular embodiments. In these and other ways, two or more scrollbars may be used to navigate sets and other logical groupings of multi-page data.

Figure 9:
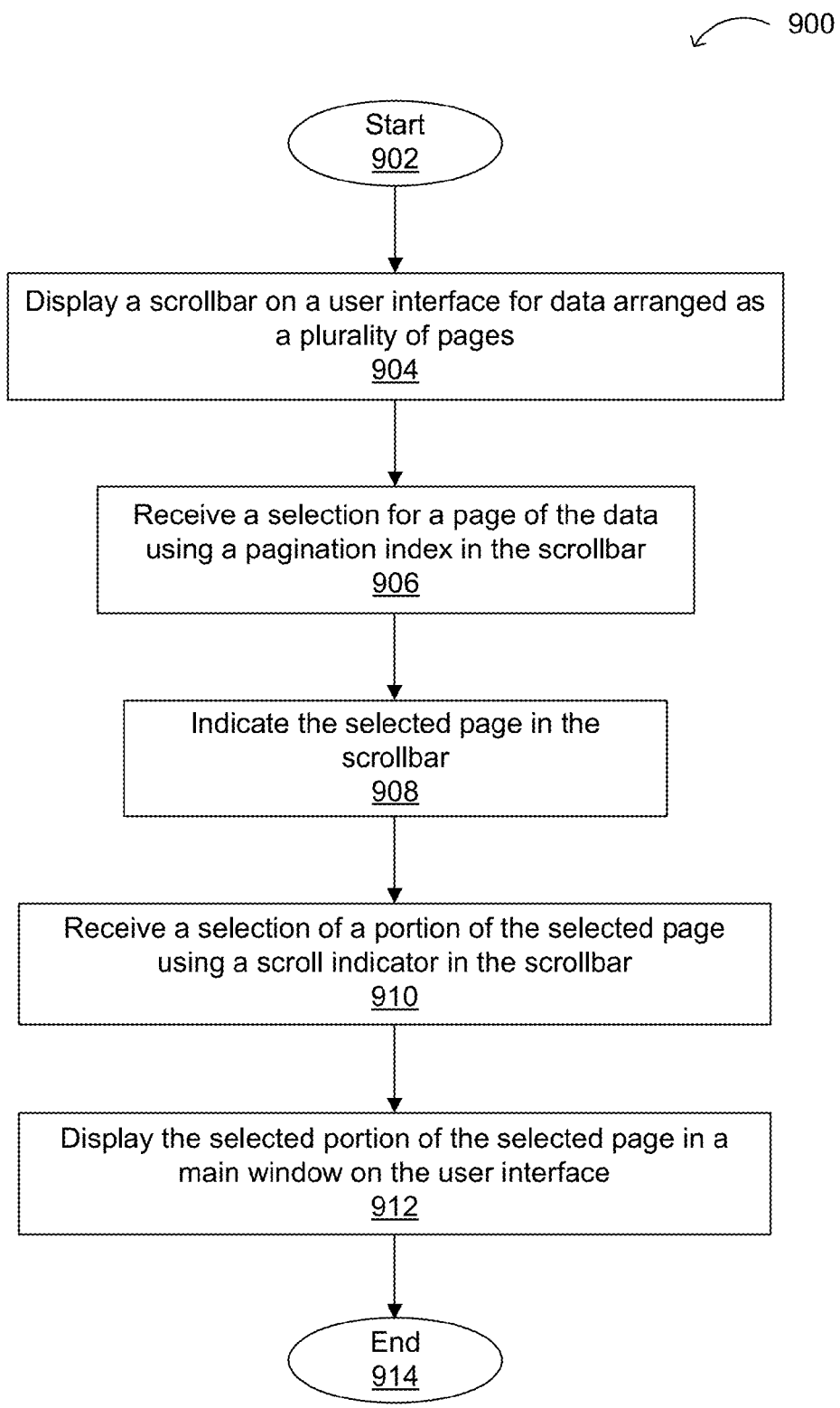
FIG. 9 is a flow diagram of an example method of accessing multi-page data, according to one embodiment.

FIG. 9 shows a flow diagram 900 of an example method of accessing multi-page data, according to one embodiment. To begin 902, in one embodiment, a scrollbar is displayed as part of a user interface 904. The user interface may be coupled to or otherwise provided to the user by user system 112 as part of a software application (e.g., web browser, database viewer, word processor, etc.) and/or operating system (collectively referred to as "software application"). Data within the software application can be arranged as a plurality of pages, where one or a portion of one of the pages is displayed in a main window of the user interface. Navigating to a different page, in one embodiment, is done using a page index in a scrollbar 906, where the scrollbar is part of the provided user interface. For example, a user may click a mouse (or other user input device) on a particular page in the page index in order to navigate to a new page. Alternatively, the user can use a scroll indicator, like the one described above, to navigate to a different page.

Once a page is selected, the selected page, in one embodiment, may be highlighted in the scrollbar 908. As shown above in the screenshot example of FIG. 4 (402), a highlight, selection box, or any other suitable indicator can be used to convey that a particular page in the page index has been selected. In addition, a sliding bar or scroll indicator (e.g., 404) may also be included in the scrollbar, and a selection of a portion of the selected page for display can be made by using this scroll indicator 910. The scroll indicator can be used to navigate various portions of the selected page for viewing in the main window (e.g., 406) or to navigate between various pages. The selected portion of the selected page is accordingly displayed in the main window on the user interface 912, thus completing the process 914.

Note that in the preceding example, one or more implementations are illustrated for accessing multi-page data. In alternate implementations, the illustrated process and process steps may be combined into fewer steps, divided into more steps, and/or performed in a different sequence. In yet other embodiments, a different set of process steps may be used.

In one or more embodiments, the scrollbar (e.g., "Scrollodex") is substantially customizable, allowing developers and/or users to set a variety of properties related to the scrollbar and page index therein. For example, various colors, the general look and feel of the scrollbar, functions of bookmarking, etc., may all be configured by a user. This flexible design also allows for multi-level page and bookmarking for advanced organizing of excessive data.

Figure 10:
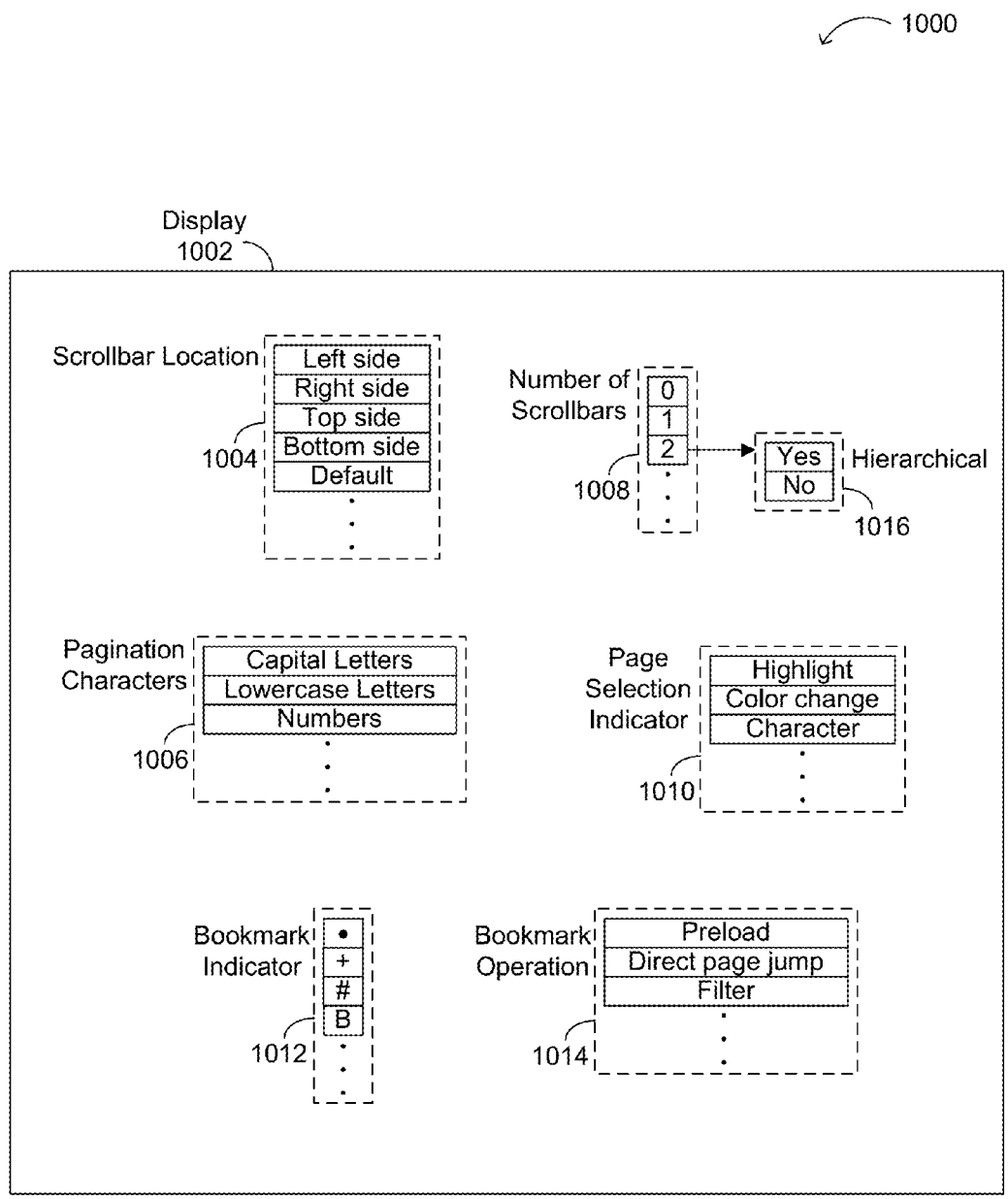
FIG. 10 is a block diagram of an example user interface for user configuration of the scrollbar, according to one embodiment.

FIG. 10 shows an example block diagram 1000 of a user interface for configuring multi-page data navigation features, according to one embodiment. The configuration display 1002 represents just one set of examples of the wide variety of possible configurations and menu choices supported in particular embodiments for customization of the scrollbar. The configuration display, in one implementation, is displayed by the software application that accesses multi-page data. In other embodiments, the user system (e.g. user system 112) displays and applies the configuration values set by the user in configuration display 1002.

In one embodiment, a default value is assigned to some or all of the configurable features. For instance, the default scrollbar location may be on the right side of the screen in a vertical orientation. In addition, in one embodiment, a user can change the scrollbar location by selecting a different location from menu 1004 (e.g., left, right, top, bottom, default, etc.). In one implementation, the default values may be affected by other factors such as the preferred language of the system, the screen size, screen resolution, type of software application, etc. For example, the default location of the scrollbar may be affected by the language used on display 1002. Typically, the default scrollbar position may be the right side of the screen when English is the system or software applications selected language. However, the default scrollbar location may switch to the left side of the screen when another language (e.g. Hebrew, Chinese, etc.) is the standard.

In one or more implementations, the symbols used in the page index to distinguish one page from another page are configurable. In menu 1006 (e.g., capital letters, lowercase letters, numbers, as well as any particular font, language, etc.), a user can select the characters and symbols they prefer to see displayed on a page index. The characters and symbols may be set to a default, and may be based on the language chosen for the user interface.

In one implementation, the bookmark indicator can also be configured via the configuration display 1002. For example, via menu 1012, a user can configure the look and feel of the bookmark indicator (e.g., whether it is a dot, +, #, B; the size of the character or symbol; the color; etc.). This configuration can be done via a drop down menu, a text box, HTML fillable box, or other UI control. In this way, a user may enter the symbol or character that is used to designate the bookmark indicator. In addition, this bookmark indicator can change to another character (e.g., from "+" to "−", from a blue dot to a red dot, from a dot to no dot, etc.) when a bookmark page is selected. The character to which the configured bookmark indicator changes may also be configured by the user, such as via another menu, another fillable box, or the like. Default values can of course also be employed for the bookmark indicators. In this way, a user may enter the symbol or character that is used to designate the bookmark indicator.

In one embodiment, configuration display 1002 allows the user to configure the number of scrollbars to be displayed. This can be done via drop down menu 1008 (e.g., 0, 1, 2, etc.), via a text box, a fillable box, or some other UI control. To illustrate, assume the user inputs 0 into menu 1008. By inputting zero scrollbars, the user essentially configures the system to hide all scrollbar from the user interface. This may be done to accommodate another method of navigating the multi-page data or to increase the amount of available screen real estate.

Further, in one implementation, if multiple scrollbars (e.g., 2 or more) are selected, another menu 1016 may pop up to allow selection of what type of information is associated with which scrollbar. For example, the first scrollbar may be configured to navigate through chapter information, while the second scrollbar is set to navigate through chapter pages, etc.

Alternatively, multiple scrollbars can be used to access different sets of data, such as when a first scrollbar provides indexes for pages of a first set of data, and a second scrollbar provides indexes for pages of a second set of data. The first and second sets of data may be related or unrelated sets of data. Multiple scrollbars may be preferred by a user simply when the underlying data or number of pages of the data is excessively large, even for a reasonable number of page indexes in a single scrollbar. As discussed above, the first and second sets of data can be hierarchically related, or unrelated. In this fashion, a user can configure multiple scrollbars in order to effectively navigate large amounts of data, as well as varied organizations of that data.

In one implementation, a user can also configure a current page indicator through menu 1010 (e.g. to configure the highlight color, when it changes color, character, etc.). Highlighting (e.g., 408) can be utilized as the default selected page indicator, but any other suitable type of visual indication may also be employed. For example, visual effects, such as flashing, blinking, or color changes, as well as any other visual cue or character indicated, can also be employed in particular embodiments.

In addition, bookmarking features can also be user configurable through one or more menus like menu 1014. For example, in one embodiment, the user may configure preloading and caching options related to when a bookmarked page is to be loaded (e.g., from system 116). The user may configure how and where the bookmarks are stored, and a variety of other features.

One particular bookmarking feature shown in menu 1014 is the "direct page jump" or filter option. This option allows for navigation strictly between bookmark pages. For example, if pages 3, 5, 8, and 10 are bookmarked (see, e.g., FIG. 6), the user can jump directly between pages 3, 5, 8, and 10, such as by using only a page up or down key. Such a filtering option also allows for the user to review page 3 in a contiguous fashion relative to page 5. Thus, the bookmarked pages can be navigated as a subset of the overall pages in a set of data. This option may also be triggered via another mechanism, such as may be found on the scrollbar itself, to allow the user to easily turn this option off (to have access to all pages in a set of data) or on (to have access to only the bookmarked pages).

Figure 11:
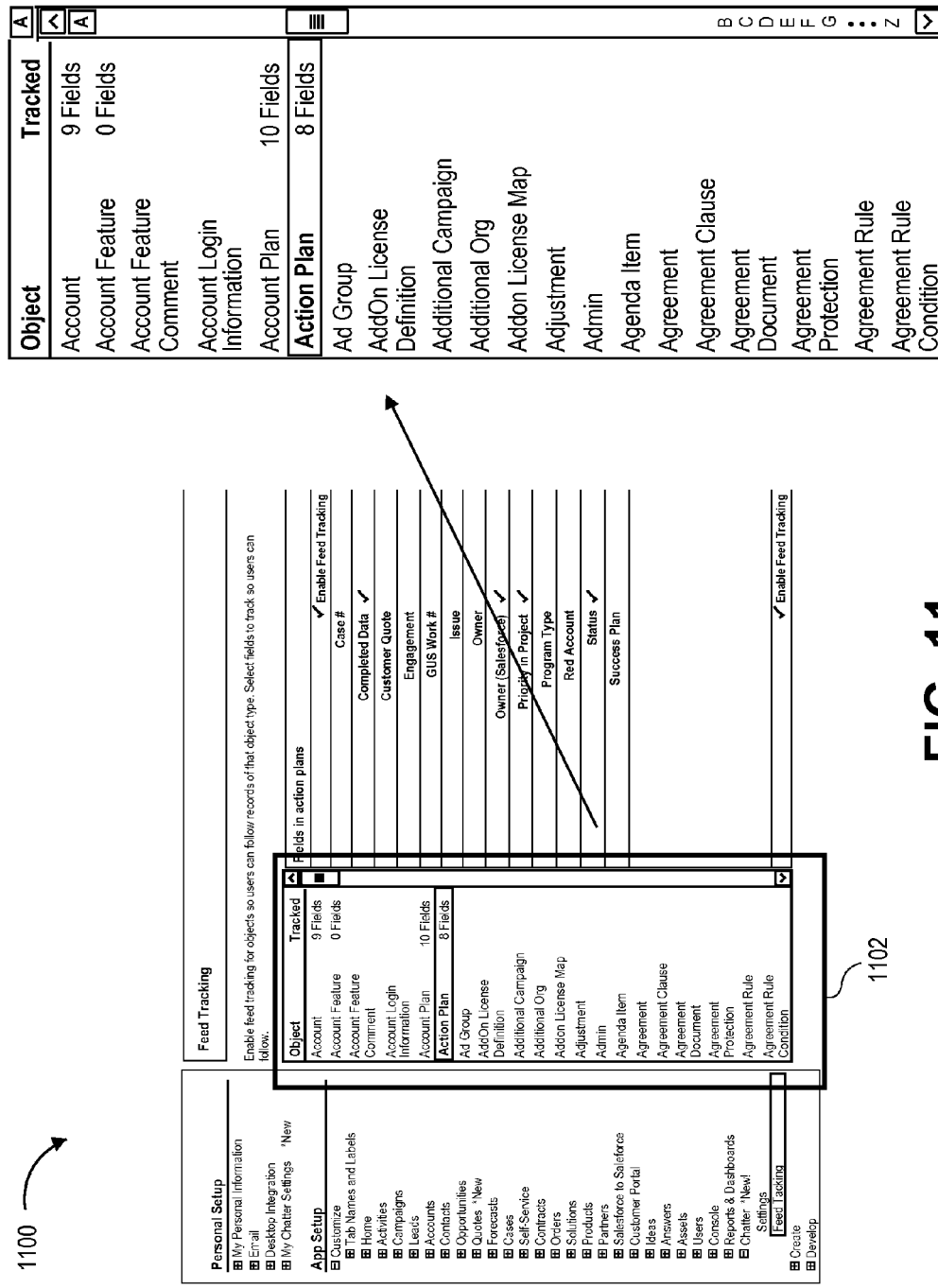
FIG. 11 is a screenshot showing an example of scroll panels of data, according to one embodiment.

FIG. 11 shows an example screenshot 1100 of panels of data that can be navigated in a fashion similar to pages, according to one embodiment. As illustrated, data may be organized in panels of data instead of pages of data. For instance, panel 1102 is a sub-portion of the entire page displayed in screenshot 1100. Accordingly, the page index refers to panels instead of pages. Thus, a selection of "A" on scrollbar 1104 accesses panel "A" (or a portion thereof) of the displayed page. This is particularly useful when a page lists a number of objects or other data in some organized way (e.g., alphabetically, numerically, etc.). For example, some data may be organized alphabetically beginning with the letter "A" (see, e.g., 1102). In this example, each set of data that begins with a letter is displayed as a separate panel on the same page. Thus, when a user selects "A" on the page index, panel "A" is accessed and navigated to. As illustrated, the user selects "Action Plan" from the displayed panel, which in turn accesses the fields associated with "Action Plan". In one embodiment, a scroll indicator can further be used to access the individual fields associated with an object in a panel. In this way, the main window may display the panel, or portions thereof, as well as fields associated with selecting a particular object (e.g., Action Plan).

Figure 12:
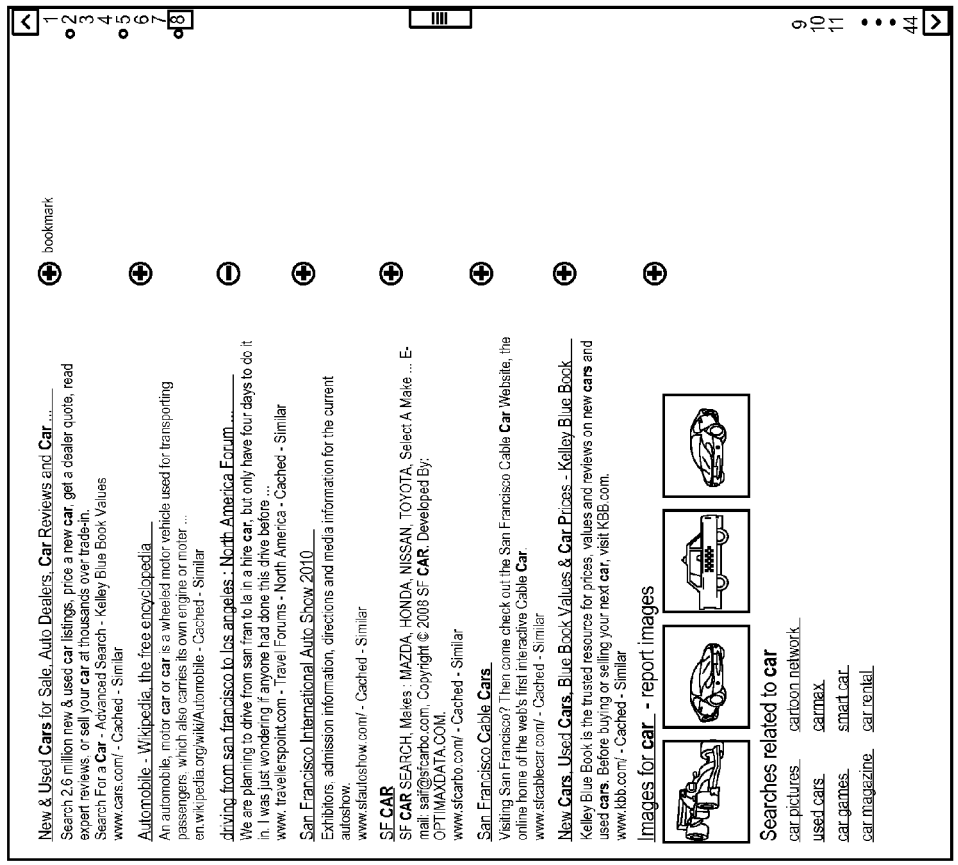
FIG. 12 is a screenshot showing an example of bookmarking dynamic data, according to one embodiment.

FIG. 12 shows an example screenshot 1200 of bookmarking dynamically generated data. In this example, data that is dynamic 1202 in nature, such as Google search results, can be bookmarked independent of a specific page. Accordingly, an item in a page is tracked rather than the page itself. Thus, for example, assume a user bookmarks an item that initially appears on page 3 of a first search result. A subsequent search result includes the same item on page 5. According to one implementation, the bookmark dynamically follows the item as opposed to the page. Hence, a bookmark indicator that originally is associated with page 3 (e.g., when the item of interest is first found) dynamically switches to page 5(e.g., indicating that the bookmarked item can now be found on page 5). This allows a user to track an item of interest, regardless of its popularity in a search result.

Figure 13:
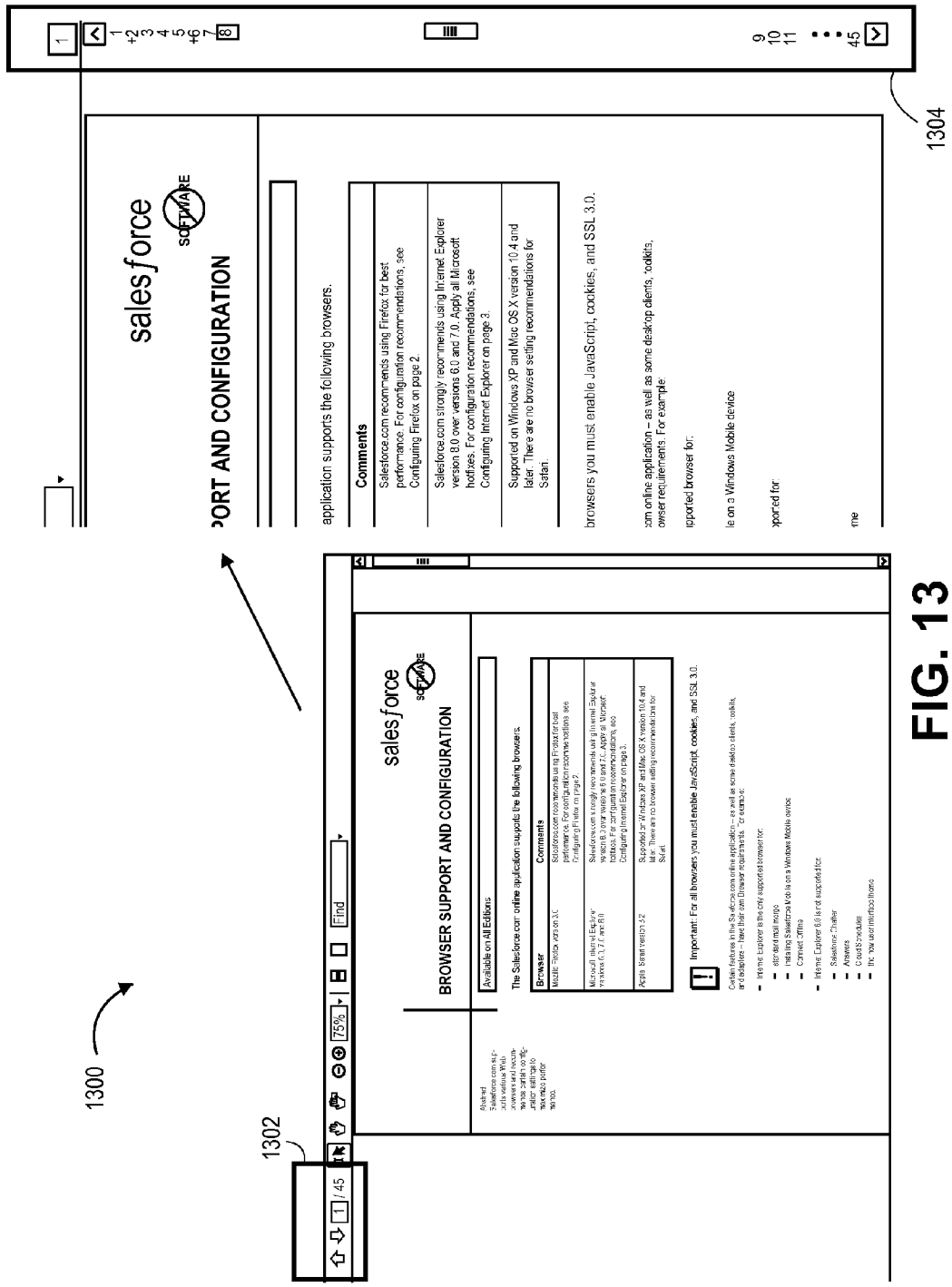
FIG. 13 is a screenshot showing an example of a vertical page display, according to one embodiment.

FIG. 13 shows another example screenshot 1300 of a vertical page display, according to one embodiment. In this example, each index in the page index corresponds to a page in a document, such as a PDF document. Thus, instead of the user clicking in sequential order through pages 1302 in a document, the user can utilize the scrollbar and page index to navigate the pages. In one or more implementations, as discussed above, the page select edit box 1304 may also be used to more easily navigate document pages. In this fashion, page indexing can be altered to facilitate user navigation for any type of document.

Figure 14:
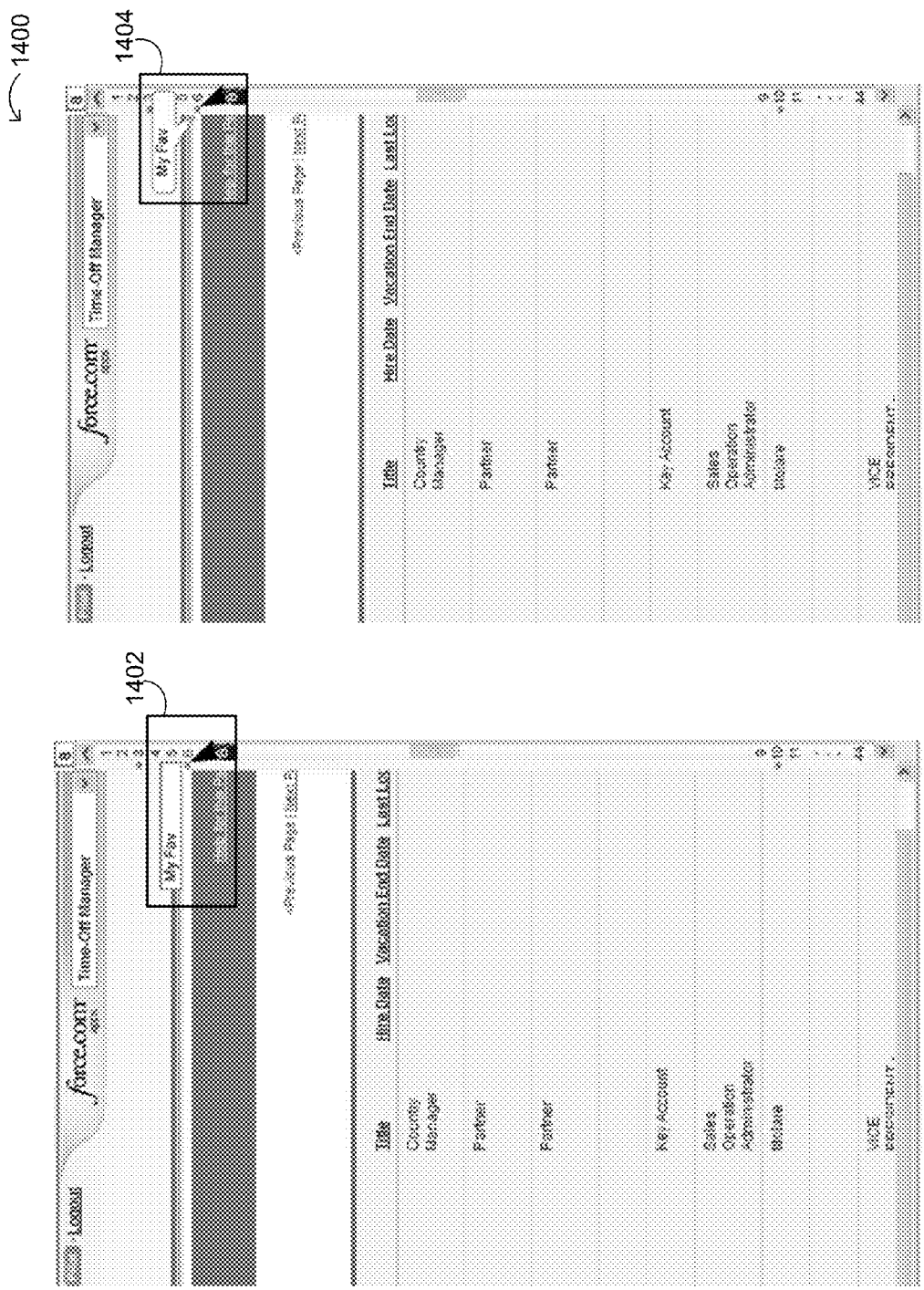
FIG. 14 shows screenshot examples of bookmarked pages with bookmark titles in a text box, according to one embodiment.

FIG. 14 shows screenshot examples 1400 of bookmarked pages with bookmark titles in a text box, according to one embodiment. In one example, once a bookmark is added to a particular page index, text edit box 1402 may appear to allow the user to label that bookmark. In another example, a mouse trigger (e.g., right click, double-click, mouse-over, etc.) can be used such that pop-up 1404 appears to display the previously entered bookmark title (e.g., "My Fav" for bookmarked page 6). Mouse triggers can also be used to change a bookmark title at a later point in time, such as well after the particular bookmark has been created. For example, a mouse-over can be used to make pop-up 1404 appear, while a right click or double-click can be used to allow text edit box 1402 to appear so that the user can change the title of that bookmark.

Scrollbars in particular embodiments can be implemented using any suitable function, tool, application, code, add-on, etc., to a website or navigation tool, such as a special cookie that may be configured on the website. The code may be downloaded from a server to a client, from system 116 to user system 112, and/or from any suitable arrangement. Such code to implement scrollbars in particular embodiments can include any suitable programming language (e.g., HTML, Apex, C, Javascript, etc.).

In a multi-tenant database system, a database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of accessing multi-page data via a user interface, the method comprising:
receiving a first page in the user interface, the first page including a first content including links to a plurality of other pages, each of the plurality of other pages having unique content corresponding to the other page;
extracting the links to the plurality of other pages;
generating a scrollbar, wherein the scrollbar includes a second page index indicating at least a subset of the links to the plurality of other pages and a scroll indicator;
displaying the scrollbar on the user interface;
receiving a selection of one of the plurality of other pages using the second page index of the scrollbar on the user interface;
appending, in response to receiving the selection of one of the other pages, a display of content corresponding to the selected other page to an end of a display of the first content of the first page;
indicating the selected other page in the scrollbar with a first predetermined indicator; and
displaying at least a portion of the selected other page in a main window on the user interface.

2. The method of claim 1, wherein the first predetermined indicator of the selected other page comprises a high-light in the second page index.

3. The method of claim 1, further comprising:
receiving an indication, via the user interface, of a bookmarking of a page in the plurality of pages; and
indicating the bookmarked page in the scrollbar with a second predetermined indicator.

4. The method of claim 3, wherein the second predetermined indicator comprises a '+' sign when the bookmarked page is not the selected page.

5. The method of claim 3, wherein the second predetermined indicator comprises a '−' sign when the bookmarked page is the selected page.

6. The method of claim 1, wherein the scrollbar is arranged on a predetermined side of the user interface and is configurable by a user.

7. The method of claim 1, wherein the scrollbar is displayed on the user interface based on customizable settings made by a user.

8. The method of claim 1, further comprising: displaying a second scrollbar on the user interface, wherein the second scrollbar is used for navigating pages of data within pages of data.

9. The method of claim 1, wherein the selection is through a scrolling of the scrollbar.

10. The method of claim 1, wherein the appending further comprises appending the selected page and any intervening pages to the first page.

11. A non-transitory computer-readable storage medium having one or more instructions thereon for accessing multi-page data via a user interface, the instructions when executed by one or more processors causing the one or more processors to carry out:
receiving a first page in the user interface, the first page including a first content including links to a plurality of other pages, each of the plurality of other pages having unique content corresponding to the other page;
extracting the links to the plurality of other pages;
generating a scrollbar, wherein the scrollbar includes a second page index indicating at least a subset of the links to the plurality of other pages and a scroll indicator;
displaying the scrollbar on the user interface;
receiving a selection of one of the plurality of other pages using the second page index of the scrollbar on the user interface;

appending, in response to receiving the selection of one of the other pages, a display of content corresponding to the selected other page to an end a display of the first content of the first page;

indicating the selected other page in the scrollbar with a first predetermined indicator; and displaying at least a portion of the selected other page in a main window on the user interface.

12. The non-transitory computer-readable storage medium of claim 11, wherein the first predetermined indicator of the selected other page comprises a high-light in the second page index.

13. The non-transitory computer-readable storage medium of claim 11, wherein the instructions when executed further cause the one or more processors to carry out:

receiving an indication, via the user interface, of a bookmarking of a page in the plurality of pages; and indicating the bookmarked page in the scrollbar with a second predetermined indicator.

14. The non-transitory computer-readable storage medium of claim 13, wherein the second predetermined indicator comprises a '+' sign when the bookmarked page is not the selected page.

15. The non-transitory computer-readable storage medium of claim 11, wherein the second predetermined indicator comprises a '−' sign when the bookmarked page is the selected page.

16. The non-transitory computer-readable storage medium of claim 11, wherein the instructions when executed further cause the one or more processors to carry out:

displaying a second scrollbar on the user interface, wherein the second scrollbar is used for navigating pages of data within pages of data.

17. An apparatus for accessing multi-page data via a user interface, the apparatus comprising:

a processor; and one or more stored sequences of instructions which, when executed by the processor, cause the processor to carry out:

receiving a first page in the user interface, the first page including a first content including links to a plurality of other pages, each of the plurality of other pages having unique content corresponding to the other page;

extracting the links to the plurality of other pages;

generating a scrollbar, wherein the scrollbar includes a second page index indicating at least a subset of the links to the plurality of other pages and a scroll indicator;

displaying the scrollbar on the user interface;

receiving a selection of one of the plurality of other pages using the second page index scrollbar on the user interface;

appending, in response to receiving the selection of one of the other pages, a display of content corresponding to the selected other pages to an end of a display of the first content of the first page;

indicating the selected other page in the scrollbar with a first predetermined indicator; and displaying at least a portion of the selected other page in a main window on the user interface.

18. The apparatus of claim 17, wherein the first predetermined indicator of the selected other page comprises a highlight in the second page index.

19. The apparatus of claim 17, wherein the instructions when executed further cause the processor to carry out:

receiving an indication, via the user interface, of a bookmarking of a page in the plurality of pages; and indicating the bookmarked page in the scrollbar with a second predetermined indicator.

20. The apparatus of claim 19, wherein the second predetermined indicator comprises a '+' sign when the bookmarked page is not the selected page.

21. The apparatus of claim 19, wherein the second predetermined indicator comprises a '−' sign when the bookmarked page is the selected page.

22. The apparatus of claim 17, wherein the instructions when executed further cause the processor to carry out: displaying a second scrollbar on the user interface, wherein the second scrollbar is used for navigating pages of data within pages of data.

* * * * *